(12) United States Patent
Yamamoto

(10) Patent No.: US 6,862,119 B1
(45) Date of Patent: Mar. 1, 2005

(54) IMAGE READING DEVICE

(75) Inventor: Yasuhiro Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/385,417

(22) Filed: Aug. 30, 1999

(30) Foreign Application Priority Data

Sep. 1, 1998 (JP) .......................................... P10-247593

(51) Int. Cl.$^7$ ................................................ H04N 1/04
(52) U.S. Cl. ...................... 358/487; 358/506; 358/474; 358/486; 358/496; 382/318; 382/319
(58) Field of Search ................................ 358/471, 487, 358/506, 474, 497, 494, 488, 468, 486, 505; 355/408, 407, 401, 40, 41; 382/319, 318; 250/208.1, 234–236

(56) References Cited

U.S. PATENT DOCUMENTS

| | | | | |
|---|---|---|---|---|
| 4,812,917 A | * | 3/1989 | Suzuki ........................ 358/494 |
| 5,673,126 A | * | 9/1997 | Ando ........................... 358/498 |
| 5,682,252 A | * | 10/1997 | Ando ........................... 358/461 |
| 5,778,276 A | * | 7/1998 | Hasegawa ..................... 399/17 |
| 5,900,950 A | * | 5/1999 | Hsu ............................. 358/497 |
| 5,917,616 A | * | 6/1999 | Chou et al. .................. 358/488 |
| 6,154,291 A | * | 11/2000 | Asai ............................. 358/468 |
| 6,163,388 A | * | 12/2000 | Lee et al. ..................... 358/488 |
| 6,295,143 B1 | * | 9/2001 | Lee et al. ..................... 358/487 |
| 6,342,957 B1 | * | 1/2002 | Itoh ............................. 358/527 |

* cited by examiner

Primary Examiner—Cheukfan Lee
(74) Attorney, Agent, or Firm—Greenblum & Bernstein, P.L.C.

(57) ABSTRACT

The image reading device has a reading operation control processor that automatically starts a reading operation. In the reading operation, first, it is determined whether a film is attached to the image reading device. When the film is not attached to the image reading device, the reading operation is not proceeded. Conversely, when the film is attached to the image reading device, a pre-scanning operation is performed in which an image recorded in a film is read with a relatively coarse pitch, after a waiting time has passed. Then, a regular scanning operation is performed in which the image is read with a pitch finer than that of the pre-scanning operation.

5 Claims, 8 Drawing Sheets

IMAGE READING DEVICE

BACKGROUND OF THE INVENTION

1. Field of the Invention

The present invention relates to an image reading device which controls a reading operation in which an image, recorded in a film, for example, is read.

2. Description of the Related Art

In a conventional film scanner, a reading operation of an image is carried out by depressing a button after the film is attached to the film scanner. The reading operation includes a pre-scanning operation and a regular scanning operation. The pre-scanning operation is carried out so as to preview an image read by the film scanner, and in the pre-scanning operation, the image is read with a relatively coarse pitch. In the regular scanning operation, the image is read with a relatively fine pitch. For performing the reading operation, the conventional film scanner is provided with buttons which are used for selecting the pre-scanning operation and the regular scanning operation.

Thus, in the conventional film scanner, it is always necessary to depress a button to perform the pre-scanning operation and then depress the other button to perform the regular scanning operation. Therefore, the operation of carrying out the reading operation is complicated.

SUMMARY OF THE INVENTION

Therefore, an object of the present invention is to provide an image reading device in which a reading operation is simplified so that a process time for the reading operation is shortened.

According to the present invention, there is provided an image reading device comprising a read object sensing processor and a reading operation control processor.

The read object sensing processor senses whether a read object is attached to the image reading device. The reading operation control processor automatically starts a reading operation in which an image recorded in the read object is read, when a waiting time has passed, after it is sensed that the read object is attached to the image reading device.

Further, according to the present invention, there is provided an image reading device comprising a read object sensing processor, a timer and a reading operation control processor.

The read object sensing processor senses whether a read object is attached to the image reading device. The timer measures a time elapsed since the read object was attached to the image reading device. The reading operation control processor automatically starts a reading operation in which an image recorded in the read object is read, when the elapsed time reaches a predetermined waiting time.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
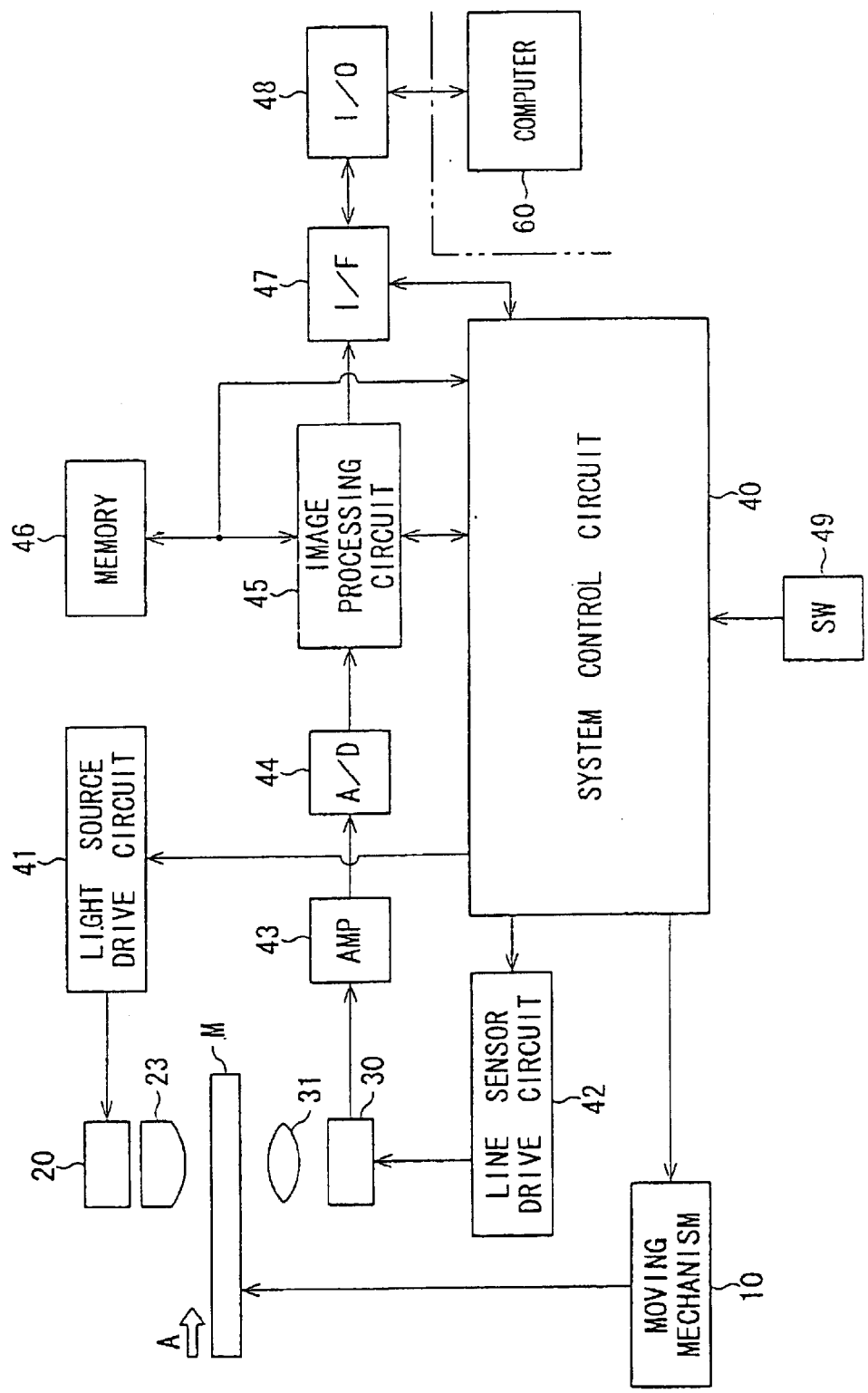
FIG. 1 is a block diagram showing an image reading device of an embodiment of the present invention.

The present invention will be described below with reference to embodiments shown in the drawings.

FIG. 1 shows an electrical structure of an image reading device of an embodiment of the present invention.

A read object M, handled by this image reading device, is a transparent negative or positive film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photodiodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital image data are subjected to an image process, such as a shading correction, in an image processing circuit 45, and are then stored in a memory 46.

The digital image data, subsequent to being read from the memory 46, are subjected to various correction processes, such as a color correction and a gamma correction. Then, the corrected digital image data are converted to a signal, which conforms to a predetermined format, by an interface circuit 47, and are outputted through an input/output terminal 48 to an external computer 60, which is provided outside the image reading device. The image processing circuit 45 and the interface circuit 47 are controlled by the system control circuit 40.

A film sensing switch 49 is connected to the system control circuit 40. The film M is supported by a film holder (not shown), and when the film holder is attached to the image reading device and set to a predetermined position, the film holder is sensed by the film sensing switch 49. Thus, the existence of the film M can be determined by the system control circuit 40.

Figure 2:
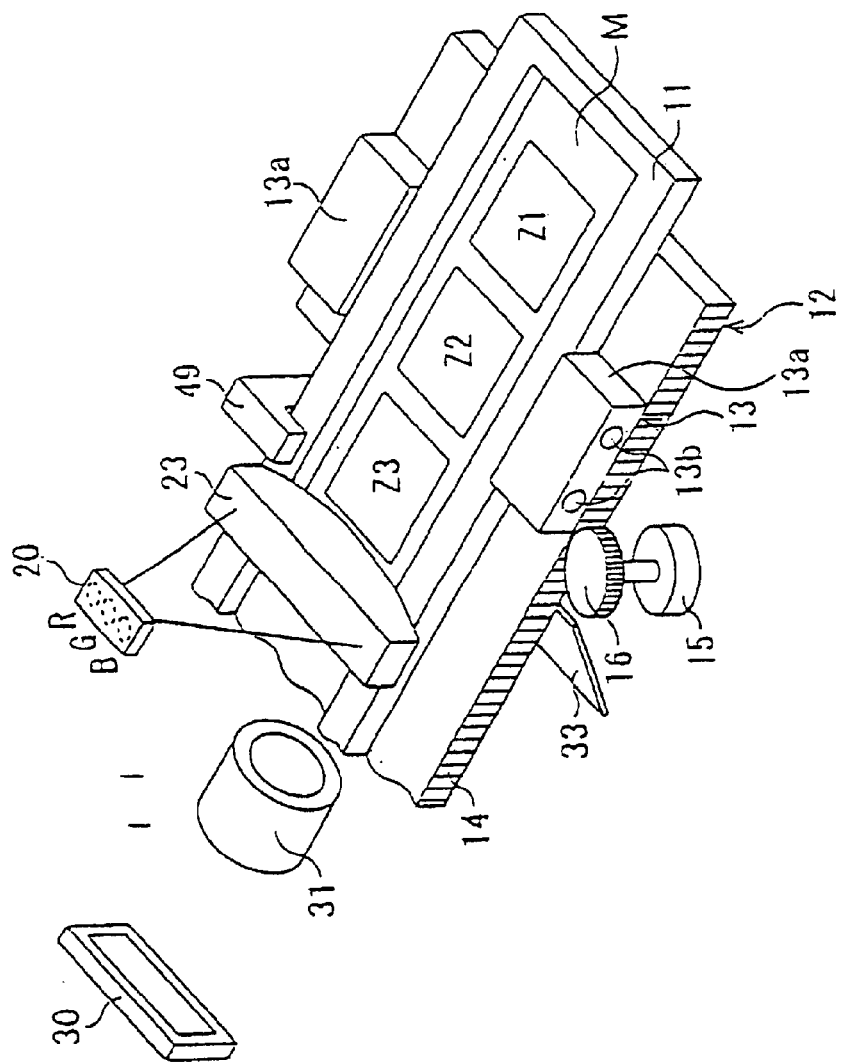
FIG. 2 is a perspective view showing a moving mechanism, a light source and a line sensor.

FIG. 2 shows a mechanism for moving the film M. Note that, in a state shown in the drawing, the film M is set to an initial position where a reading operation, in which one of the images recorded in the film M is read, is started.

The film M is a strip film in which six images Z1, Z2, Z3, . . . , for example, are recorded, and is supported by a slender film holder 11. A fixing mechanism 13 is provided on a plate stage 12. The fixing mechanism 13 has a pair of guide members 13a fixed on the stage 12. The film holder 11 is guided by inner walls of the guide members 13a, and can be displaced along the stage 12.

Each of the guide members 13a is provided with plungers 13b, which is constantly urged by a spring (not shown) towards the film holder 11. Recesses (not shown), with which the plunger 13b can be engaged, are formed on a side surface of the film holder 11 at an interval of one image size. By engaging the plunger 13b with the recesses, the film holder 11 is fixed to the stage 12. By applying a force sufficiently greater than the spring force to the film holder 11, a position of the film holder 11 relative to the stage 12 can be changed. Namely, the fixing mechanism 13 forms a so-called click-stop mechanism.

A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the film M are controlled. Namely, the rack 14, the motor 15 and the pinion 16 form the moving mechanism 110 (FIG. 1).

The film sensing switch 49 is provided at a side of the stage 12 where the rack 14 is not formed. The film sensing switch 49 is an optical sensor, which outputs an ON-signal when a light is interrupted by the film holder 11, and is an OFF-state when a light is not interrupted. Namely, the state of attachment of the film M to the image reading device is sensed by the film sensing sensor 49.

An image, which is to be read, is positioned at an opening (not shown) formed in the stage 12, so that a light-beam radiated onto the image can pass through the film M. The light source 20 is provided above the opening, and the cylindrical lens 23 is located between the light source 20 and the opening. A mirror 33, which is omitted in FIG. 1, is disposed at a position below the stage 12 and corresponding to the light source 20. The cylindrical lens 23, positioned between the light source 20 and the stage 12, is extended in a direction perpendicular to the longitudinal direction of the film M. The mirror 33 is inclined at approximately 45 degrees relative to the stage 12. A forming lens 31 is disposed under the stage 12 to face the mirror 33. The line sensor 30 is provided behind the forming lens 31, and is extended in parallel to a longitudinal axis of the mirror 33.

The light source 20 has light-emitting diodes emitting red (R), green (G) and blue (B) light beams, respectively. When an image is read, these light-emitting diodes are turned ON in a predetermined order, and thus, a light beam radiated from each of the light-emitting diodes is condensed by the cylindrical lens 23, so that a line-shaped light beam is radiated onto the film M. Thus, the image recorded in the film M is formed on a light receiving surface of the line sensor 30 through the forming lens 31.

Figure 3A:
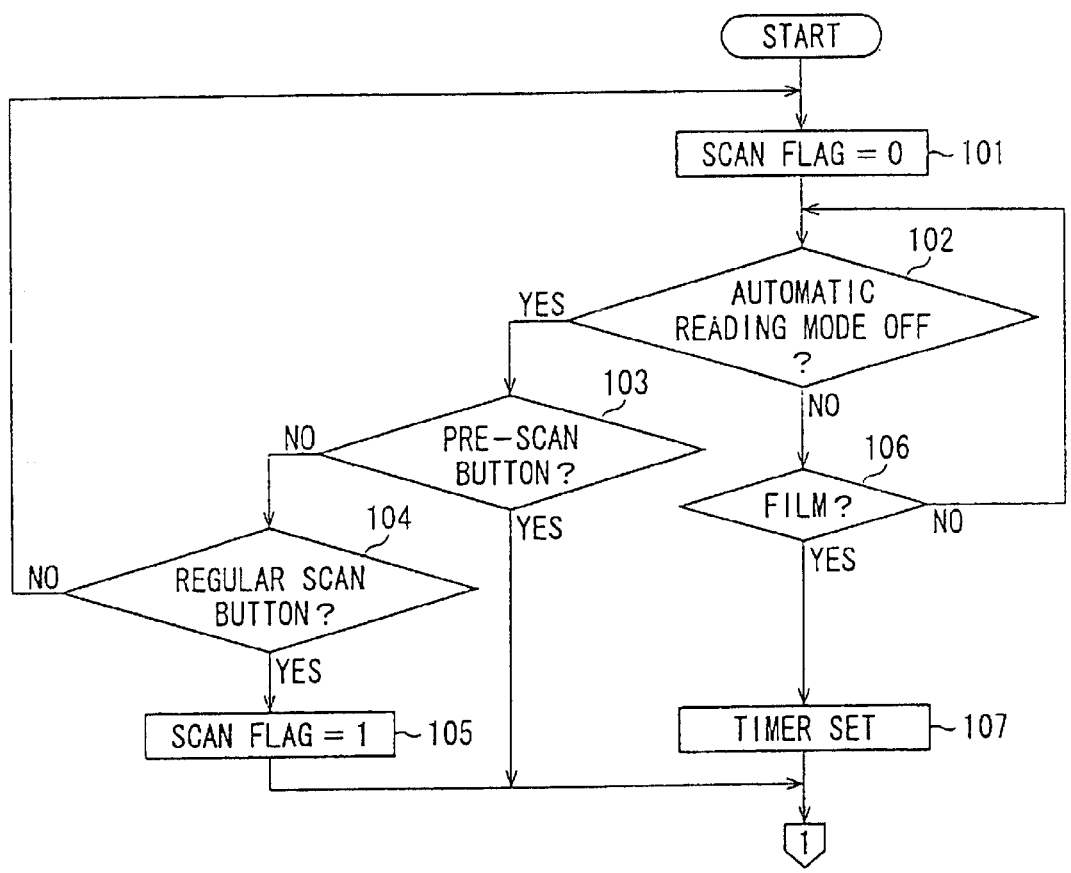
FIGS. 3A and 3B show a flowchart of an image reading routine executed in the image reading device.
Figure 3B:
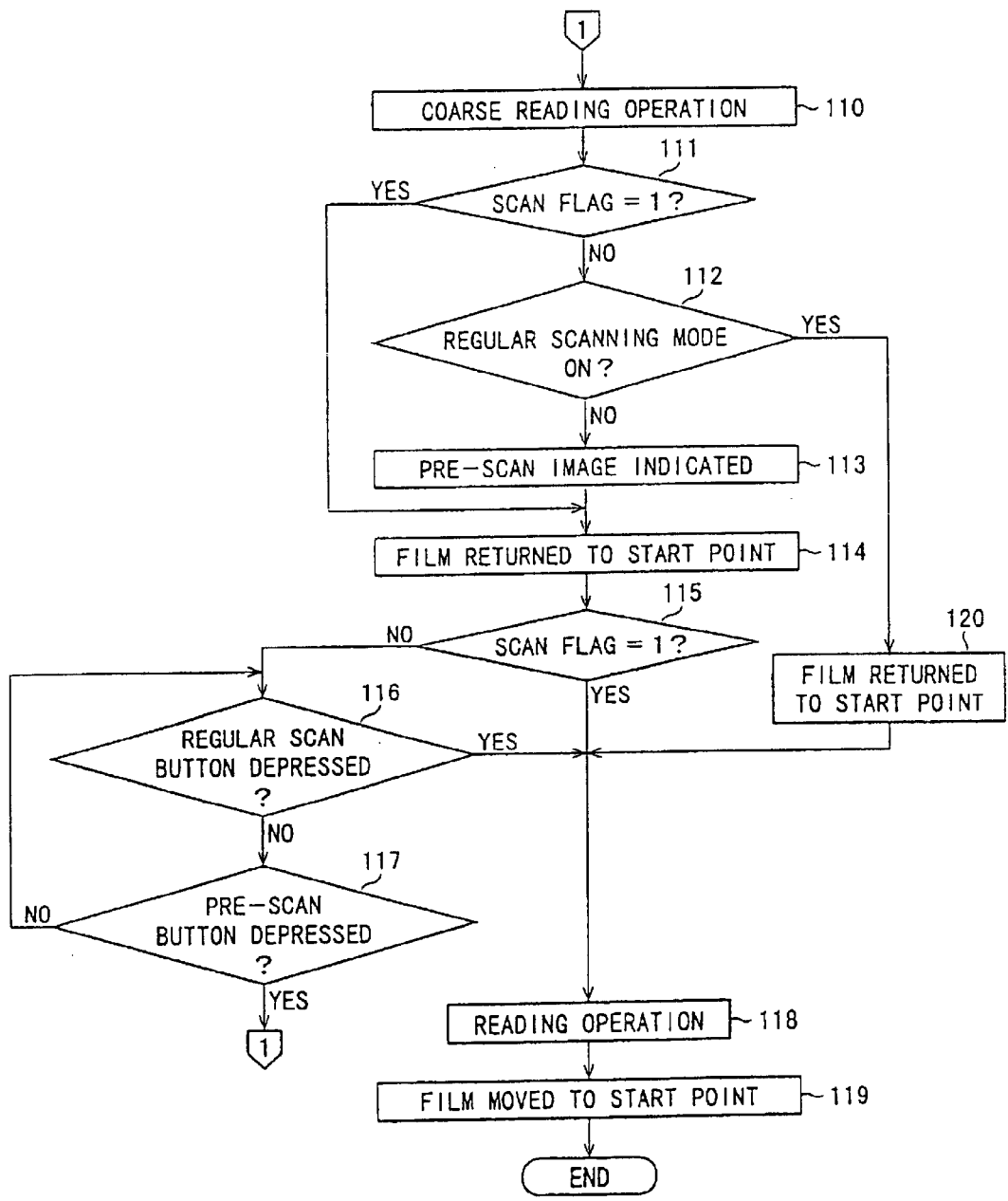
Figure 4:
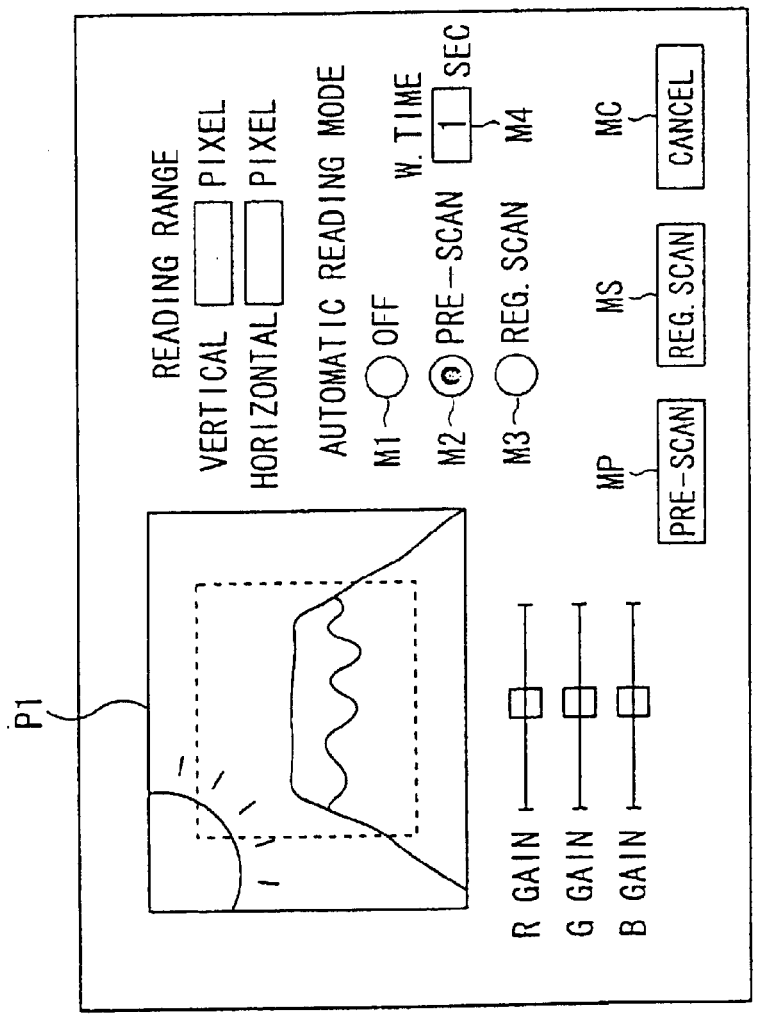
FIG. 4 is a view showing an example of a surface of a display device of a computer.

FIGS. 3A and 3B show a flowchart of an image reading routine executed in the image reading device. FIG. 4 shows an example of a surface of the display device of the computer 60. In the embodiment, the operation of the image reading device is controlled by clicking a mouse, for example to depress a predetermined label indicated on the surface of the display device.

In step 101, a scan flag is set to 0. In Step 102, it is determined whether an automatic reading mode is turned OFF. The automatic reading mode is changed by clicking on marks M1, M2 and M3 of "OFF", "PRE-SCAN" and "REGULAR SCAN" indicated on the surface of the display device, by using a mouse. The marks M1, M2 and M3 of "OFF", "PRE-SCAN" and "REGULAR SCAN" are constructed in such a manner that only one of them is selected.

When the mark M1 of "OFF" is depressed so that the mark M1 is changed from a white circle to a black circle, the automatic reading mode is turned OFF. When the mark M2 of "PRE-SCAN" is depressed so that the mark M2 is changed from a white circle to a black circle, the pre-scanning mode included in the automatic reading mode is turned ON. When the mark M3 of "REGULAR SCAN" is depressed so that the mark M3 is changed from a white circle to a black circle, the regular scanning mode included in the automatic reading mode is turned ON.

A situation in which the automatic reading mode is turned OFF is described below.

Namely, it is determined in Step 102 that the automatic reading mode is turned OFF, and thus, Step 103 is executed to carry out a reading operation in a manual mode. In Step 103, it is determined whether a button MP of "PRE-SCAN" indicated on the surface of the display device is depressed using the mouse. When the button MP is depressed, the process goes to Step 110, and when the button MP is not depressed, the process goes to Step 104, in which it is determined whether a button MS of "REGULAR SCAN" indicated on the surface of the display device is depressed. When the button MS of "REGULAR SCAN" is depressed, the scan flag is set to 1 in Step 105, and Step 110, is then executed. Conversely, when the button MS is not depressed, the process goes back to Step 101. Namely, when neither the button MP of "PRE-SCAN" nor the button MS of "REGULAR SCAN" is depressed, Steps 101 through 104 are repeatedly executed.

In Step 110, an image recorded in the film M is read with a relatively coarse pitch. Before this coarse reading operation, the film M is set at a position (i.e., a start point) where an end portion of the image, which is to be read, is aligned with the line sensor 30. In the coarse reading operation, in a state in which the light source 20 is turned ON, the film M is intermittently moved with a pitch coarser than a reading operation (i.e., a regular scanning operation) executed in Step 118. In this intermittent movement, the light source 20 is controlled in such manner that the light-emitting diodes radiating R, G and B light beams are illuminated in a predetermined order, at every time the stage 12 is stopped. Thus, R, G and B image data corresponding to an image recorded in the film M are sensed.

Based on the image data, an exposure time, by which colors of a finally obtained image become close to natural, and exposure parameters, which are used for carrying out a color correction, are obtained. Further, the coarse reading operation of Step 110 serves as a pre-scanning operation, and the R, G and B image data obtained by the coarse reading operation ate stored in the memory 46 to indicate a pre-scan image on the surface of the display device.

In Step 111, it is determined whether the scan flag is 1. When the scan flag is 0, i.e., when the process goes from Step 103 to Step 110, it is determined in Step 112 whether the regular scanning mode is set. Since it is supposed that the automatic reading mode is turned OFF, the regular scanning operation is not set. Therefore, the process goes from Step 112 to Step 113, in which a pre-scan image PI is indicated on the surface of the display device based on the image data obtained in Step 110, and Step 114 is then executed.

Conversely, when it is determined in Step 111 that the scan flag is 1, i.e., when the process goes from Step 105 to Step 110, Steps 112 and 113 are skipped, and Step 114 is executed.

In Step 114, the film M is returned to the start point i.e., a position where the coarse reading operation is started in Step 110. In Step 115, it is determined whether the scan flag is 1. When the scan flag is 0, the process goes to Step 116, in which it is determined whether the regular scan button MS is depressed. When it is determined in Step 116 that the regular scan button MS is depressed, the process goes to Step 118, in which the regular scanning operation is performed. Conversely, when it is determined in Step 116 that the regular scan button MS is not depressed, the process goes to Step 117, in which it is determined whether the pre-scan button MP is depressed. When the pre-scan button MP is depressed, the process goes back to Step 110, in which the coarse reading operation, i.e., the pre-scanning operation is performed. When the pre-scan button MP is not depressed, the process goes back to Step 116. Namely, when neither the scan button MS nor the pre-scan button MP is depressed, Steps 116 and 117 are repeatedly executed.

When it is determined in Step 115 that the scan flag is 1, and when it is determined in Step 116 that the scan button MS is depressed, Step 118 is executed. Namely, the film M is intermittently moved with a pitch finer than that of the coarse reading operation in Step 110, and each of the light-emitting diodes is illuminated in a predetermined order at every time the stage 12 is stopped, so that R, G and B image data are sensed. The image data are transferred to the computer 60, so that the image, read by the image reading device, is indicated on the surface of the display device.

In Step 119, the film M is moved to a start point corresponding to an end portion of an image which is to be read in the next reading operation, and thus, the image reading routine ends.

Therefore, in a state in which the automatic reading mode is turned OFF, when the pre-scan button MP is depressed, Steps 101, 102, 103, 110, 111, 112 and 113 are performed in this order, so that the image obtained by the pre-scanning operation is indicated on the surface of the display device. Then, when the scan button MS is depressed, Steps 115, 116 and 118 are executed in this order to carry out the regular scanning operation, and the image data may be recorded in a recording medium.

A case in which the automatic reading mode is turned ON, i.e., a case in which the mark M2 or M3 is selected, is described below.

The process goes from Step 102 to Step 106, in which it is determined, based on a signal output from the film sensing sensor 49, whether the film M is attached to the image reading device. When the film M is attached, Step 107 is executed, and when the film M is not attached, Step 102 is again executed. Namely, while the film M is not attached, Steps 102 and 106 are repeatedly carried out.

In Step 107, a timer is set, and thus a waiting time of 1 second, for example, is provided. Namely, Step 110 is executed 1 second after the timer is set, so that the coarse reading operation is performed.

Since it is determined in Step 111 that the scan flag is 0, the process goes to Step 112, in which it is determined whether the regular scanning mode is set. When the regular scanning mode is set, Step 118 is executed after the film M is returned to the start point in Step 120, so that a reading operation (i.e., a regular scanning operation) is carried out.

Conversely, when it is determined in Step 112 that the regular scanning mode is not set, a pre-scan image is indicated on the surface of the display device in Step 113, and Step 114 is then executed. Then, since it is determined in Step 115 that the scan flag is 0, the process goes to Step 116, in which the operation previously described above is performed.

As described above, when the automatic reading mode has been set, and after the waiting time has elapsed in Step 107, the processes of Step 110 and the following Steps are automatically carried out. Namely, the coarse reading operation of Step 110 is performed without further command from the user.

In the automatic reading mode, if the regular scanning mode is set, Steps 120 and 118 are immediately executed without indicating an image in Step 113, so that the regular scanning operation is carried out. Namely, without operating the pre-scan button MP and the regular scan button MS, the pre-scanning operation (Step 110) and the regular scanning operation (Step 118) are performed, and thus, a time required for performing the image reading operation is shortened in comparison with a conventional device.

Conversely, in the automatic reading mode, when the pre-scanning mode is set, the pre-scan image is indicated in Step 113, and Steps 114, 115 and 116 are then executed in this order. Thus, when the user depresses the pre-scan button MP or the scan button MS, the pre-scanning operation or the regular scanning operation is performed due to Step 116 or 117. In other words, it is prohibited that the regular scanning operation is automatically performed, and the regular scanning operation or the pre-scanning operation is performed in accordance with Step 116 or 117, in which it is checked that a command signal, by which the regular scanning operation or the pre-scanning operation is started, is input.

The length of the waiting time of Step 107 can be changed freely. This is performed by changing a numerical value indicated in a column M4 of the waiting time on the surface of the display device, by using a mouse or a keyboard.

Note that a label MC, shown on the surface of the display device, indicates a cancel button. When depressing the cancel button during a process included in the image process routine, the process is compulsorily stopped even when the process is not completed.

Figure 5A:
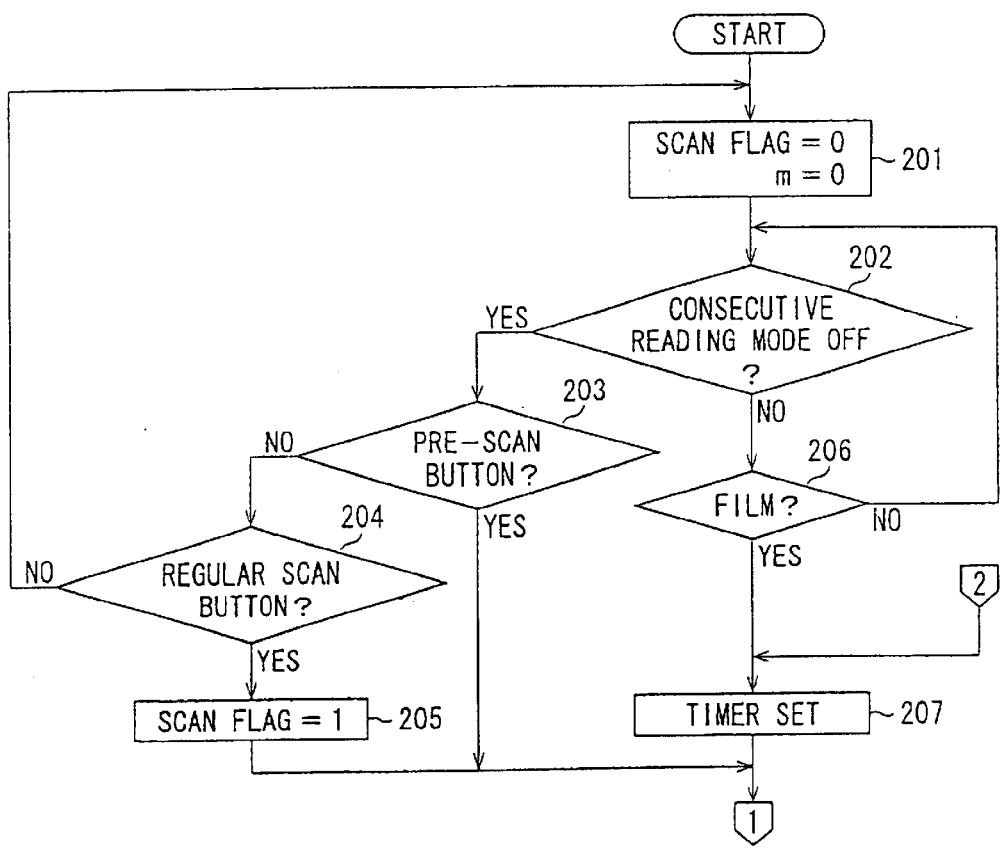
FIGS. 5A, 5B and 5C show a flowchart of another example of the image reading routine.
Figure 5B:
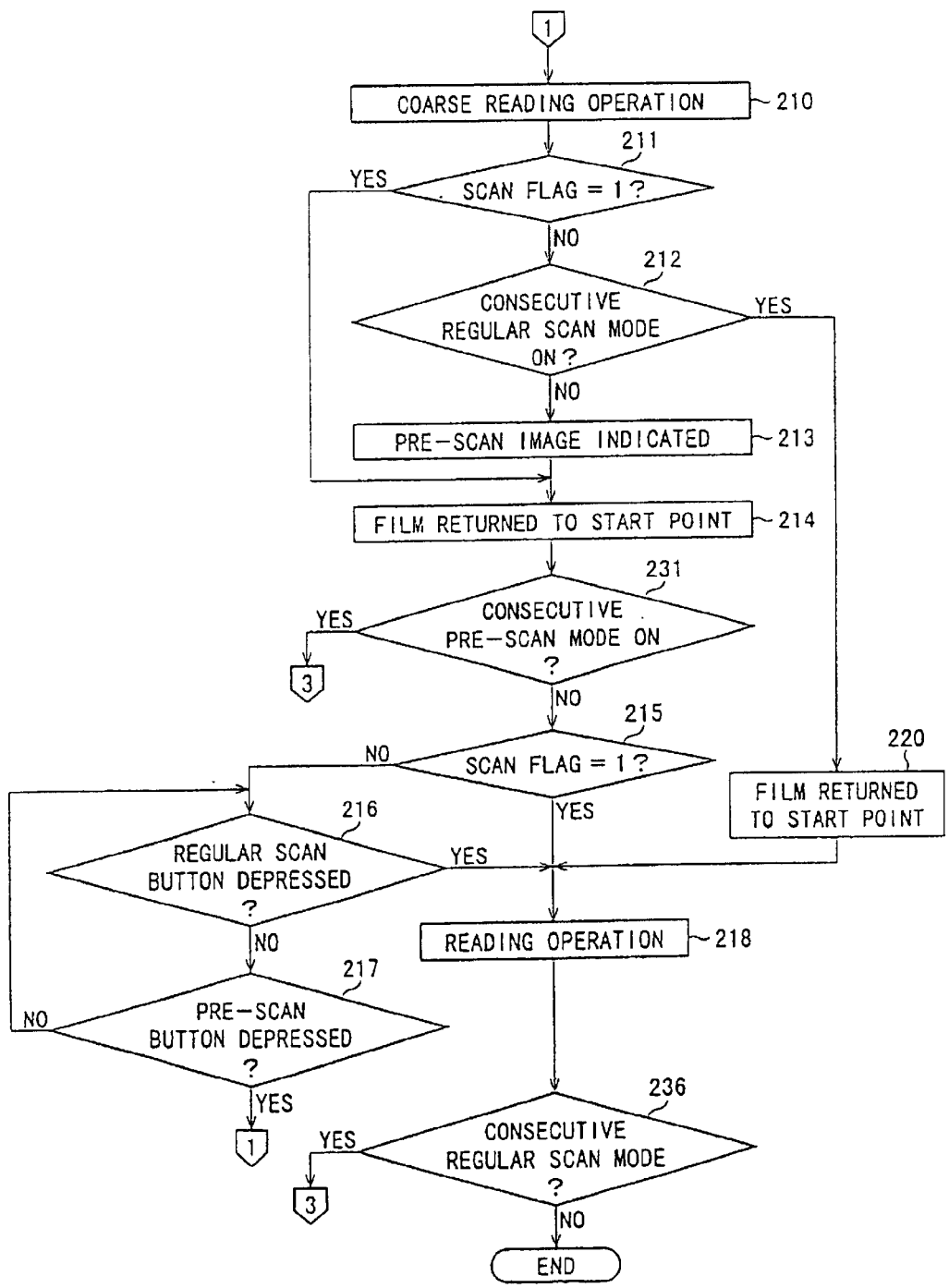
Figure 5C:
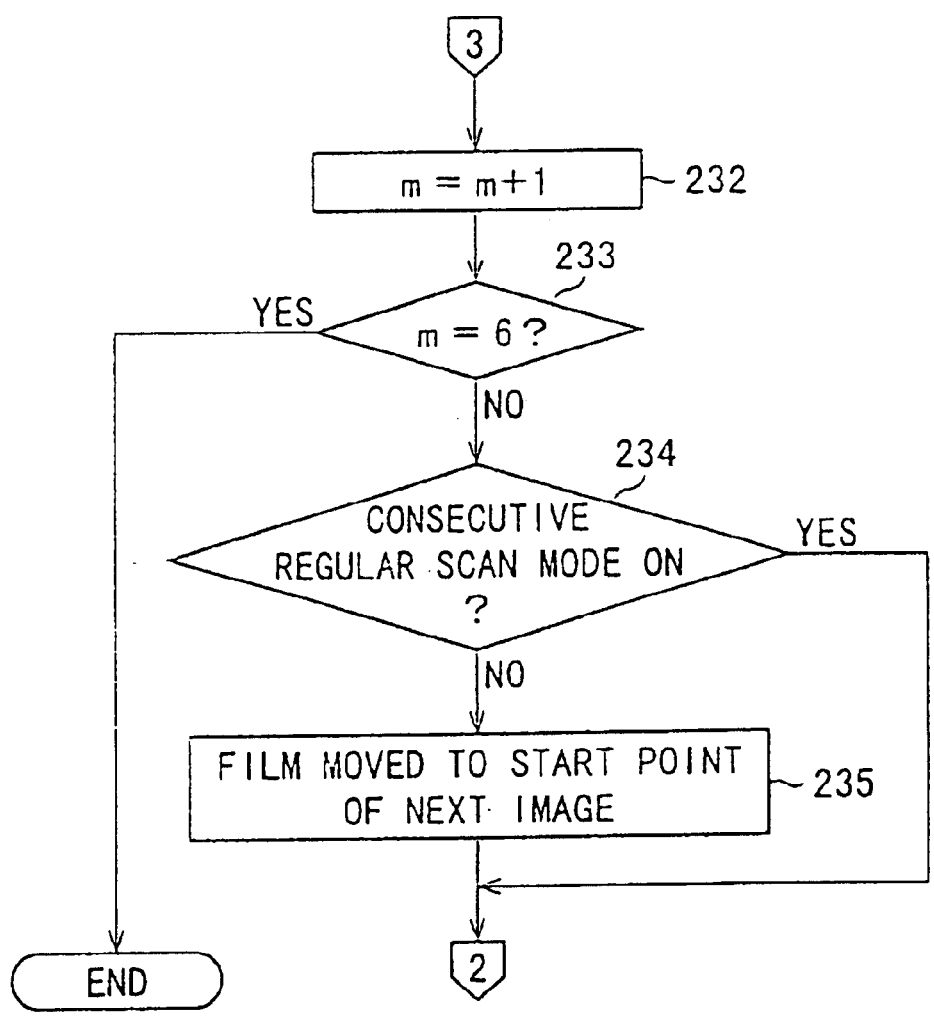

FIGS. 5A, 5B and 5C show a flowchart of another example of the image reading routine, in which a consecutive reading mode can be set. Namely, the pre-scanning operation and the regular scanning operation can be automatically and consecutively performed for six images, for example, recorded in a single film M. Note that, the reference numerals indicated for each Step in FIGS. 5A, 5B and 5C, are increased by 100 over that of the corresponding Step of the flowchart shown in FIGS. 3A and 3B. For example, Step 201 corresponds to Step 101 of the flowchart of FIG. 3A.

In Step 201, a scan flag is set to 0, and a counter "m" which corresponds to an image, is set to 0. In Step 202, it is determined whether the consecutive reading mode is turned OFF. The consecutive reading mode is turned ON by depressing a predetermined mark indicated on the surface of the display device, as the marks M2 and M3 shown in FIG. 4, for example.

When the consecutive reading mode is turned OFF, Step 203 is executed, and when the consecutive reading mode is turned ON, Step 206 is executed. The contents of Steps 203 through 207 and 210 are the same as those of Steps 103 through 107 and 110 of FIGS. 3A and 3B. Namely, an image reading operation, which is performed by depressing the button MP or MS (see FIG. 4), is the same as that of FIG. 3A. In the following description, it is assumed that a consecutive reading mode is set, which includes a consecutive pre-scan mode and a consecutive regular scan mode. The consecutive pre-scan mode and the consecutive regular scan mode are selected, for example, by depressing predetermined marks (corresponding to M2 and M3 shown in FIG. 4) indicated on the surface of the display device, by using a mouse, respectively.

In Step 211, it is determined whether a scan flag is set to 1. Since it is assumed that the consecutive reading mode is set, Step 205 is not executed, and thus, the scan flag is 0. Therefore, Step 212 is executed in which it is determined whether a consecutive regular scan mode is turned ON. When the consecutive regular scan mode is turned OFF, i.e., when the consecutive pre-scan mode is turned ON, Step 213 is executed in which a pre-scan image PI (see FIG. 4), obtained in Step 210, is indicated on the surface of the display device. Then, in Step 214, the film M is returned to a start point of the image, which has been read in Step 210, and Step 231 is then executed, in which it is determined whether the consecutive pre-scan mode is turned ON.

When the consecutive pre-scan mode is selected, the process goes from Step 231 to Step 232 such that a pre-scanning operation is carried out for the next image. In Step 232, the counter "m" is increased by 1. Namely, the counter "m" becomes 1 when the pre-scanning operation of the first image is completed. In Step 233, it is determined whether the counter "m" has reached 6. In this example, it is assumed that six images are recorded in the film M, and thus, in Step 233, it is determined whether the pre-scanning operations have been completed for all of the images.

When the counter "m" is 6, i.e., when the pre-scanning operations have been completed for all of the images, this routine ends. Conversely, when the counter "m" has not reached 6, Step 234 is executed in which it is determined whether the consecutive regular scan mode is turned ON. When the consecutive regular scan mode is not turned ON, i.e., when the consecutive pre-scan mode is turned ON, the process goes from Step 234 to Step 235, in which the film M is moved to a start point of the next image. This is because, in Step 214, the film M had returned to a start point of the previous image which had been read. Conversely, when it is determined in Step 234 that the consecutive regular scan mode is selected, Step 235 is skipped. This is because, in the consecutive regular scan mode, the film M had been moved to the start point of the next image in Step 218 which will be described later.

Then, the process goes back to Step 207, so that the pre-scanning operation is carried out for the next image.

On the other hand, when it is determined in Step 212 that the consecutive regular scan mode is set, the process goes to Step 220, in which the film M is returned to the start point of the image, which had been read in Step 210. Then, in Step 218, a regular scanning operation is carried out, so that the image is read and the film is moved to the start point of the next image. Then, in Step 236, it is determined whether the consecutive regular scan mode is set. Now, since the consecutive regular scan mode is set, the process goes from Step 236 to Step 232, so that the regular scanning operation is carried out for the next image. Namely, the regular scanning operation is performed in the same way as the consecutive pre-scanning operation.

Note that the contents of Steps 216 and 217 are the same as those of Steps 116 and 117 shown in FIG. 3B.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-247593 (filed on Sep. 1, 1998) which is expressly incorporated herein, by reference, in its entirety.

What is claimed is:

1. An image reading device comprising:
   a read object sensing processor that senses whether a read object is attached to said image reading device;
   a timer that measures an elapsed time since said read object was attached to said image reading device; and
   a reading operation control processor that automatically starts a reading operation in which an image recorded in said read object is read, when said elapsed time reaches a predetermined waiting time,
   wherein said reading operation control processor comprises a waiting time setting processor by which a length of said waiting time is changed, and
   wherein said reading operation includes a pre-scanning operation in which said image is read with a first reading pitch coarser than a predetermined value, and a regular scanning operation in which said image is read with a second reading pitch finer than said first reading pitch, the first and second reading pitches being associated with relative movement between a scanning member and the read object during the pre-scanning operation and the regular scanning operation, respectively.

2. A device according to claim 1, wherein said read object sensing processor comprises an optical sensor.

3. A device according to claim 1, further comprising a reading operation selecting processor that selects one of said pre-scanning operation and said regular scanning operation.

4. The image reading device according to claim 1, said reading operation control processor being configured to perform a reading operation as one of a pre-scanning operation and a scanning operation.

5. The image reading device according to claim 1, the scanning member comprising a line sensor configured to scan the read object.

* * * * *